Figure 1:
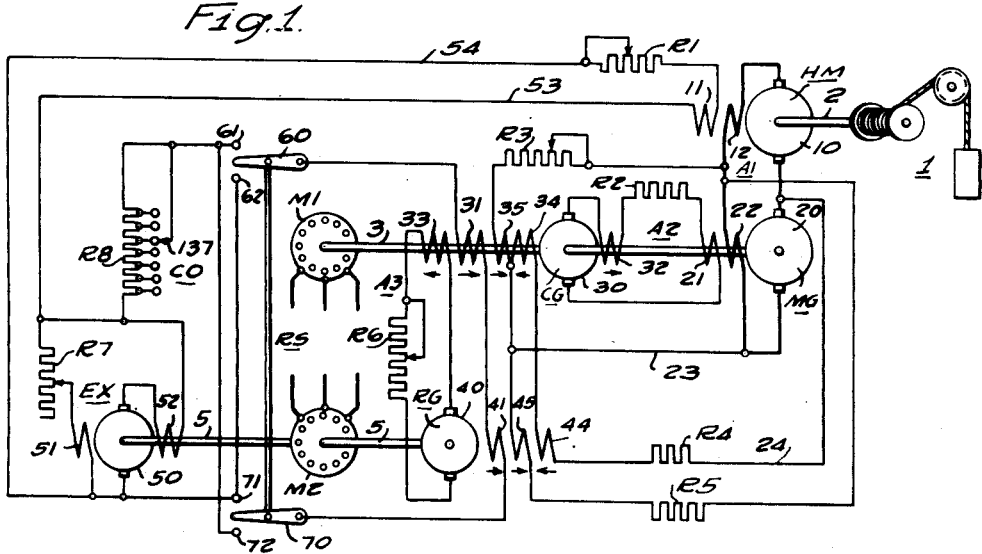

March 20, 1951    A. W. KIMBALL ET AL    2,546,003
CURRENT LIMIT GENERATOR

Filed Feb. 28, 1948    2 Sheets-Sheet 1

WITNESSES:
E. A. McCloskey
New. C. Groome

INVENTORS
Albert W. Kimball and
Martin H. Fisher.
BY
Paul E. Friedemann
ATTORNEY March 20, 1951 A. W. KIMBALL ET AL 2,546,003
CURRENT LIMIT GENERATOR
Filed Feb. 28, 1948 2 Sheets-Sheet 2

WITNESSES:

INVENTORS
Albert W. Kimball and
Martin H. Fisher.
BY
Paul E. Friedemann
ATTORNEY Patented Mar. 20, 1951

2,546,003

UNITED STATES PATENT OFFICE 2,546,003

CURRENT LIMIT GENERATOR

Albert W. Kimball, Buffalo, N. Y., and Martin H. Fisher, Pittsburgh, Pa., assignors to Westinghouse Electric Corporation, East Pittsburgh, Pa., a corporation of Pennsylvania Application February 28, 1948, Serial No. 11,908

16 Claims. (Cl. 171—227)

Our invention relates to electric machines, particularly in connection with drives of the Ward Leonard or variable voltage type.

The control system of such a drive includes a generator whose armature output circuit feeds energizing current of variable voltage to the drive motor to be controlled, while the generator field is supplied with regulatable excitation from a controlled current source which may consist of another generator so as to form a cascade arrangement of dependently operating generators.

In control systems of the general type just described, it is often desirable to impose certain limitations on the output current or voltage applied to the machine to be ultimately controlled or supplied by one of the generators of one or more of the following generators of the cascade arrangement. This will best be understood from an example:

In mine hoist drives, reversing blooming mills and other similar equipment where heavy masses are to be accelerated, it is desirable to limit the peak currents acting on the motor, in order to prevent damage to the motor and the equipment driven thereby. The torque of the hoist motor and, consequently, the stress on the ropes and other mechanical parts are a function of the motor current. Therefore, limiting the current to a maximum value will, in turn, keep the mechanical stress at a safe value. The hoist motor and its associated generator are designed to commutate certain maximum currents. Sparking at the brushes will be excessive when these currents are exceeded, and more than normal maintenance will then be required to keep the commutator functioning properly. Hence, a limitation of the maximum current will reduce the maintenance cost on the main equipment and afford the application of equipment with smaller margins of overload rating.

While attempts have heretofore been made to solve the difficulties and with some measure of success, such previous designs had some serious limitations. Due to the physical construction of the current limit generator, there was no space for commutating poles, and thus the armature load current was limited by the commutating ability of the machine without commutating poles. Further, the resultant saturation curve of this generator differed from the one theory dictated. The generator also would not operate on a saturating curve that remains at zero for a certain rise in motor load current and then rise as the motor load current increased some more.

The cause of most excessive current in mine hoist drives is a too rapid advancement of the master controller. That is, if the operator attempts to bring the hoist up to speed too rapidly, the torque required to produce this acceleration is accompanied by excessive current in the motor.

In order to prevent such overloads, current-limiting circuit breakers or interrupters may be employed. However, the action of such breakers is apt to interfere with an efficient operation and may lead to other drawbacks incident to the interruption of the operating current.

These conditions, while elucidated by the example of mine hoists, obtain also in other kinds of cascade-connected generator systems for variable voltage control.

It is an object of our invention to provide control systems of the type here in point which afford an automatic current limitation without the use of circuit breakers, or the like interrupting devices, in the control system proper.

According to another object, the invention aims at providing a cascade-connected generator arrangement for variable voltage control in which a current-limiting effect is produced by one of these generators.

It is also an object to provide an electric machine, such as a generator, whose characteristic of operation affords a limiting effect so as to be applicable in systems and for the purpose just mentioned.

Another object of our invention is to provide a reversible current-limiting drive control in accordance with the foregoing aims that permits an asymmetric operation, i. e., a shifting of the limit conditions in dependence upon the direction of a control function, in particular when applying the control system to hoist drives.

In order to achieve the above-mentioned objects and advantages, the invention, in one of its aspects, consists in a variable voltage control system designed and functioning in the following manner: A main generator with an armature circuit for supplying the variable voltage to be controlled has its field circuit connected to the armature output circuit of a regulating generator, either directly or over an intermediate cascade-connected generator, whose field circuit is energized in dependence upon the current to be controlled and inductively associated with saturable magnetic means for biasing the energization of the main generator field due to saturation of the magnetic means when the current exceeds a given limit value so as to produce the desired current or voltage limiting effect.

In another aspect, allied to the foregoing and more specific, the invention provides for the direct or indirect control of the main generator a regulating generator whose field poles include magnetic shunt means which become saturated when the appertaining field current, in dependence upon the current to be controlled, exceeds a given value.

Figure 2:
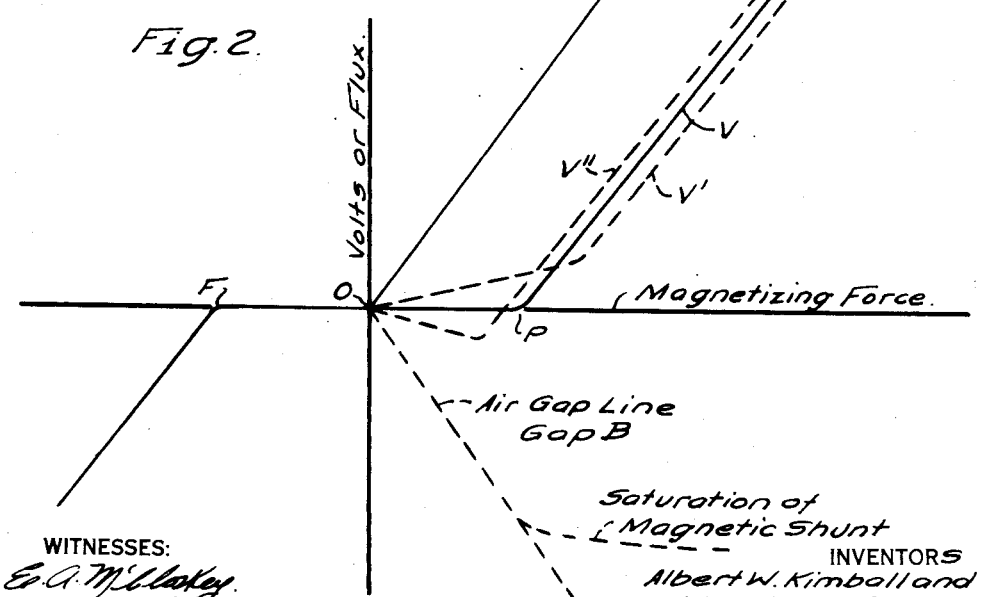
Figure 3:
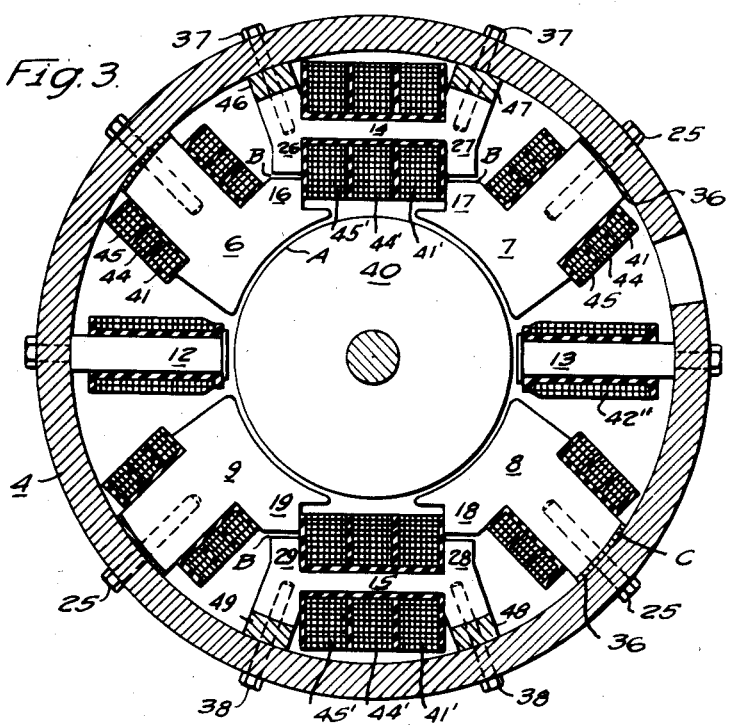
Figure 4:
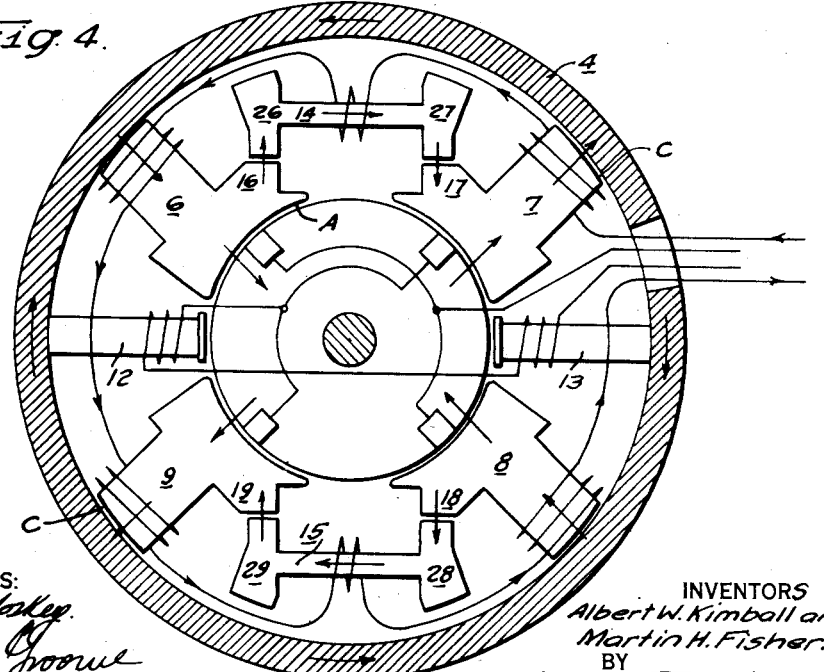

Other objects, advantages, and features of the invention will be apparent from the description, presented hereinafter, of the embodiment illustrated in the drawings, in which:

Figure 1 exemplifies the invention by showing a circuit diagram of a control system for a mine hoist drive, and Fig. 2 is an explanatory diagram relating to the saturation characteristic of a current-regulating generator which forms part of the control system of Fig. 1, while Figs. 3 and 4 represent cross-sectional views of a machine built in accordance with our teachings to provide the required saturation characteristic and to be used as a current-regulating generator in the control system of Fig. 1.

Referring to the hoist control system shown in Fig. 1, the hoisting equipment proper is schematically indicated at 1 and includes a hoisting drum whose shaft 2 is mechanically connected to the armature 10 of a driving motor HM. The field winding 11 of motor HM is energized from a separate current source of substantially constant voltage, and to this end is connected through leads 53 and 54 with an exciter generator denoted by EX. The connection includes an adjusting rheostat R1. Once properly adjusted, the rheostat R1 need not be varied during the operation of the control system.

The armature 10 of the hoist motor HM is connected to a feed circuit A1 in series arrangement to the armature 20 of a main generator MG which forms the current source of the feed circuit A1. The main generator MG has a main field winding 21 connected to a control circuit A2 whose current source is formed by the armature 30 of a control generator CG. A resistor R2 is series-arranged in circuit A2. Numeral 22 denotes a compensating or interpole winding of the main generator MG.

The control generator CG has five field windings, numbered 31 through 35, in order to control the voltage impressed on the main generator field winding 21. Consequently, the resultant energization of field winding 21 depends on the interaction of the five field windings of the control generator CG and determines the voltage and current supplied by the main generator armature 20 through the feed circuit A1 to the hoist motor HM, thereby controlling the torque or speed of the hoisting equipment driven by the motor HM.

The armature output current in circuit A2 is principally determined by the field winding 31 which, therefore, is designated in the following as the principal, or pattern, field winding of the control generator CG. The self-energizing field winding 32 serves to amplify the control effect and is connected in the circuit A2. While this connection is shown as a series arrangement, a self-energizing shunt winding may be used instead. Considering the field of winding 31 as a reference and assuming that the generator MG supplied energy to the hoist motor rather than functioning in a regenerative sense, windings 32 and 35 act cumulatively; that is their ampere turns are in a proper direction to assist the ampere turns of field winding 31. In contrast thereto, the two field windings 33 and 34 act differentially with regard to winding 31. It should be noted that for certain values of current in circuit A1, as explained later, field winding 33 will be substantially deenergized. However, as long as it is energized due to the action of generator RG, the effect of its ampere turns will subtract from that of the ampere turns of winding 31. In other words, the current effective in the differential field windings 33 and 34 tends to diminish the resultant field strength effective on the armature 30 of the control generator CG.

The winding 34 of the control generator CG is energized in dependence upon the voltage in the feed circuit A1, and to this end is connected by leads 23 and 24 across the armature 20 of the main generator MG. The voltage thus imposed on the field winding 34 is closely proportional to the speed of the hoist motor HM since the excitation of the motor field winding 11 is kept constant. The field winding 35 of control generator CG serves to compensate for the IR drop in the armature circuit of the hoist motor and is connected across winding 22 through leads 25 and 26 and in series with a calibrating resistor R3.

The pattern field winding 31, serving to determine the basic speed of the hoist motor, as to direction and magnitude, is energized from a current source of constant voltage under control by operator-actuated voltage regulating and reversing means. More in detail, pattern winding 31 is connected through mains 53 and 54 to the exciter EX, a reversing switch RS being interposed in order to select the polarity of the pattern voltage impressed on field winding 31. The connection includes a control device CO which has a resistor R8 connected between main 53 and reversing switch RS.

The reversing switch RS, as illustrated, has two movable contacts 60 and 70, each cooperating with two stationary contacts 61 and 62, and 71 and 72, respectively. In one position of switch RS, contact 60 is in engagement with contact 61, and contact 70 with contact 71, in order to energize the hoist motor HM for operation in the hoisting direction. In its other position, the reversing switch RS connects movable contacts 60 and 70 with stationary contacts 62 and 72, respectively, for controlling the hoist motor so as to operate in the lowering direction.

The control device CO is preferably designed in the form of a customary master controller, while the reversing switch RS and its contacts are preferably electromagnetic contactors which are controlled in accordance with the selected hoisting or lowering position of the master controller. Since the particular design of the operator-actuated control elements, here represented by CO and RS, is not essential for the invention proper and, as such, need not involve novelty over the master controllers, the simplified illustration in Fig. 1 has been chosen for the sake of convenience and clarity.

The armature 20 of the main generator MG and the armature 30 of the control generator CG are mounted on a common shaft 3 which, when in operation, is driven by a constant speed motor M1. Satisfactory operation can also be obtained if armature 30 is driven at constant speed while armature 20 is actuated by separate drive means whose speeds does not vary excessively.

Field winding 33 of the control generator CG is energized by a regulator circuit A3 which is connected to the armature 40 of a regulating generator RG through an adjusting rheostat R6 for varying the resistance of the regulator armature circuit A3. The calibration of rheostat R6 need not be changed during the operation of the control system.

Armature 40 of regulating generator RG is mounted on a common shaft 5 with armature 50 of the above-mentioned exciter EX. Shaft 5 is connected to a constant speed motor M2. It will be understood, however, that the illustrated arrangement can be modified by using a single constant speed motor for the operation of both shafts 3 and 5, or by connecting the two shafts 3 and 5 with each other so as to obtain a single motor driven generator unit.

The regulating generator RG has three field windings 41, 44, 45. Field winding 41 corresponds to the pattern field winding 31 of the control generator CG and is connected in series with this winding so as to be energized by the pattern voltage adjusted at the controller CO. Field winding 44 of regulating generator RG is similar in function to the voltage or speed responsive field winding 34 of control generator CG and is connected in series therewith across armature 20 of main generator MG, a calibrating resistor R4 being inserted in series with winding 44. Field winding 45, hereinafter called the "regulating field winding," is excited in accordance with the current in the feed circuit A1 and to this end is connected, through a calibrating rheostat R5 and leads 23 and 25, across a voltage measuring impedance in circuit A1, for instance the interpole and compensating winding 22 of generator MG in parallel to the IR-drop compensating field winding 35 of generator CG. When in operation, both windings 35 and 45 are traversed by a current whose magnitude varies in accordance with the voltage drop across the interpole field winding 22.

In order to achieve the control functions in accordance with the above-stated objects of my invention, a particular design of the two auxiliary generators CG and RG and their appertaining field exciting means is necessary, as will be set forth presently.

The control generator CG is a small electric generator, similar in design to conventional exciters. Like exciters, it possesses the ability to accurately amplify small amounts of energy supplied to its field into larger amounts for the control of large electrical machines. However, the control generator possesses this ability to a much higher degree and represents a sensitive amplifier, capable of working on very small inputs to its fields to produce a very large output in the armature circuit. This sensitivity is due to the action of the self-excited field winding 32 which feeds a small portion of the control generator output power back into the control generator as excitation to produce still more output. The field of winding 32 is just sufficient to sustain the generated voltage but, by itself, is incapable of building up the output of the machine. Hence the action of the control generator is always under the control of one or more of the separately excited field windings 31, 33, 34 and 35.

With this adjustment of the self-excited field, the ampere turns from the other field exciting means (windings 31, 33, 34, 35) can be balanced to the null point. This null condition exists when a field excitation which measures the motor speed is balanced by the field excitation of the pattern field winding caused by the standard or pattern voltage as adjusted, at will, by the operator by selecting the position of the master controller.

The motor speed corresponds to the fundamental equation:

Speed=constant×(applied armature voltage-armature IR drop)

As stated previously, the voltage responsive field winding 34 of generator CG measures the armature voltage, and the winding 35 measures the interpole IR drop which is proportional to the motor armature IR drop since winding 22 carries the same current as the motor armature. The relative polarities of field windings 34 and 35 are such that their ampere turns are subtractive differential relative to each other and thus satisfy the above equation. The resultant speed measuring ampere turns of windings 35 and 34, as a whole, are balanced against the pattern field of winding 31.

When the motor is running at the speed called for by any selected setting of the master controller, the speed measuring ampere turns exactly cancel the ampere turns of the pattern field. Assuming the current limiting field winding 33 to be deenergized at this moment, the only effective excitation on the control generator comes now from the field of the self-energized winding 32 and there is no tendency to change the generator excitation. Should the motor speed vary from the proper value, the balance between the pattern and speed measuring excitations is disturbed, the resulting excess ampere turns then act to correct the error in motor speed. In this manner the control generator CG provides a sensitive and accurate speed regulation. However, it has also a current or torque limiting effect due to its interconnection with the regulating generator RG.

It will be seen from the foregoing description that the control fields on the control generator that is the pattern, voltage and IR-drop fields, have their counterpart on the regulating generator and that the corresponding field windings of the two auxiliary generators are connected in series, with the exception of the current and IR-drop field windings 35 and 45 which are paralleled to provide for independent adjustment. The proportions and relative polarities of the control fields and the current limiting field of the control generator CG are such that the current limit field will cancel the effect of any of the control fields under given operating conditions to be explained later. In other words, suppose there is a current of one ampere in the pattern field winding 31 on the control generator. This current also flows in the pattern field winding 41 of the regulating generator and generates the proper voltage to make the ampere turns of the current limit winding 33 oppose the ampere turns of the pattern field winding 31, when this is necessary to limit the load current of motor HM.

In order to apply such a current limiting control, some means must be employed to produce this canceling action only at times when the load current would otherwise exceed a safe maximum value. To accomplish this, the regulating generator RG is given the special characteristic typified by the curve in Fig. 2. This characteristic differs from that of conventional machines by having an extended low-voltage or zero-voltage interval between points F and P which are both displaced from the zero point O by fixed amounts of excitation.

A characteristic of this type can be obtained by providing the field poles of the generator with a saturable magnetic shunt as exemplified by Fig. 3 and Fig. 4.

It is essential for the invention that the regulating generator RG or the appertaining circuit connections include a saturable magnetic device for producing a current-limiting control effect. This will be explained hereinafter. For the sake of convenience, however, a more complete description of the remaining electric circuit devices shown in Fig. 1 may first be given.

The exciter EX has two self-exciting fields 51 and 52. 51 is a shunt field and connected with the exciter output circuit over an adjusting rheostat R7 serving to adjust the exciter voltage to a proper magnitude. Rheostat R8 is not actuated during the control operation of the system so that the exciter output voltage remains constant. The exciter field 52 is series connected in the exciter output circuit. A single exciter field winding or a different arrangement and connection of the exciter field windings may be chosen without affecting the essential operation of the system since the only purpose of the exciter EX is to represent a convenient current source of sufficiently constant voltage.

The control device CO here illustrated as a tapped resistor is preferably designed in the form of a customary controller, and the reversing switch RS as a customary master switch. Since this preferable design of the main control elements is not essential for the invention proper, and controllers with master switches being well known as such, the simplified illustration in Fig. 1 has been chosen for the sake of convenience and clarity.

Turning now to a more detailed description of the regulating generator RG, let us recall the above-mentioned current-limiting function assigned to the regulating generator. As explained, the illustrated control system functions so as to operate the hoist motor HM in accordance with the direction and speed magnitude adjusted by the control device CO and the reversing switch RS. Suppose, however, that the slide contact 137 is displaced with such a speed in the direction to cause motor HM to accelerate that the load current in circuit A1 would exceed a safe value, thus overstressing the mechanical hoisting equipment and tending to cause excess sparking at the commutator of the motor. Then the control effect of the regulating generator RG is of such nature as to prevent these excess currents and accompanying detrimental phenomena. This limiting function is based on the fact that the excitation of the current-measuring winding 45 produces a field cumulative to that of the principal field winding 41. Thus causing the excitation of RG to be greater than the point P in Fig. 2 which results in an output voltage and consequent excitation of field 33 on control generator CG. Field 33 opposes field 31 and by thus controlling the excitation of CG and consequently the main generator MG, the current in circuit A1 is limited to the predetermined maximum value. That is, the intended effect of the regulating generator RG is to reduce the resultant excitation of the control generator CG and hence the excitation of the main generator MG and thereby the current and voltage magnitudes in the feed circuit A1. Of course, this reduction is only desired when the load current in feed circuit A1 tends to exceed the safe value.

It should be noted that should the slider 137 be moved too rapidly toward the high resistance position, the inertia of the revolving mechanical parts including the armature of motor HM can prevent the hoist from slowing down rapidly, and large regenerative currents may then be passed through the feed circuit A1. The regulating generator RG then acts so as to make the field of winding 45 cumulative with that of winding 44 thus causing the excitation of RG to be greater than point F in Fig. 2. This excitation then produces an output voltage which excites field 33 of control generator CG in such direction as to oppose winding 34. In this manner it causes the output of CG to be maintained at such value that the main generator MG voltage is maintained at such a value that the regenerative current of motor HM is limited to the predetermined maximum value.

An ideal method of obtaining the just-mentioned load limitation by the action of the regulating generator RG would be to keep the current through field winding 33 zero for all permissible values of current in the feed circuit A1 but to cause this field current to rise sharply from zero to a relatively high value for any current in excess of the maximum permissible value. In order to have the regulating generator RG produce such a control effect, its magnetic saturation curve in the just-mentioned ideal case should be similar to that denoted by the curve $v$ in Fig. 2.

In the coordinate system of Fig. 2, the abscissa represents values of excitation effective in the regulator armature RG, while the ordinate shows the voltage values in the regulator armature circuit A3, i. e. the voltage effective across the differential field winding 33 of the control generator CG.

According to this ideal saturation curve $v$, the armature output voltage of generator RG remains zero for all values of excitation up to a maximum value which corresponds to the desired maximum value of the current in the feed circuit A1. Any excitation beyond that corresponding to the desired maximum value of current in circuit A1 causes the voltage in circuit A3 to rise steeply to a much higher value, thereby causing the differential field winding 33 to decrease the resultant field in generator CG and hence the output voltage of the main generator MG accordingly.

In order to achieve the ideal saturation curve just discussed, a special magnetizable magnetic circuit is associated with alternate pairs of the poles of opposite polarity of the energizing circuit of the regulating generator RG. More particularly, the desired magnetic saturation effect is obtained by providing the magnetic field poles of the regulating generator with a magnetic shunt path so arranged and related to the main portion of the field pole that all of the magnetic flux is bypassed away from the armature as long as the shunt portion is unsaturated.

A generator for regulating purposes of the type just suggested is illustrated in Figs. 3 and 4. In these figures, 4 designates the regulating generator frame. This frame 4 carries the main or exciting poles 6, 7, 8, and 9 and the interpoles or commutating poles 12 and 13. This ability to use commutating poles with a regulating generator for the purposes specified is one of the important contributions of our invention.

The polarities of the poles 6, 7, 8, and 9 is north, south, north, south, respectively. We place a magnetic shunt 14 between poles 6 and 7 and a magnetic shunt 15 between poles 8 and 9. The poles 6 and 7 at their facing regions adjacent the armature 40 are provided with the projections 16 and 17 respectively. The poles 8 and 9 are provided with similar facing projections 18 and 19.

The magnetic shunt 14 is provided with an enlargement 26 disposed in cooperative relation to projection 16 and an enlargement 27 disposed in cooperative relation to the projection 17. The magnetic shunt 15 has the enlargements 28 and 29 disposed in cooperative relation to the projections 18 and 19, respectively.

The poles 6, 7, 8, and 9 are rigidly secured to the frame 4 by the brass bolts 25 shown. A suitable number of brass shims 36 are placed between each of the poles and frame so that the radial air gap A is of a selected uniform value over each of the pole faces. The air gaps C formed at the places where the brass shims 36 are used are also substantially uniform in dimension radially since the pole pieces are assembled by the use of laminations of the same stamping, that is, the same dimensions.

The magnetic shunts 14 and 15 are secured to the frame 3 by means of brass bolts 37 and 38. Relatively thick brass blocks 46, 47, 48, and 49 are disposed between the enlargements 26, 27, 28, and 29, respectively, and the frame 4 in such manner that the air gaps B are of relatively large selected uniform width.

The magnetic shunts 14 and 15 are so dimensioned that their respective transverse sectional areas are considerably less than the transverse sectional areas of the respective poles 6, 7, 8, and 9. The poles 6, 7, 8, and 9 carry the field windings 41, 44 and 45 and the shunts 14 and 15 carry energizing coils 41', 44' and 45' connected in series, respectively, with the field windings 41, 44 and 45. The regulating generator has a commutating field 32'' connected in series with the armature.

Fig. 4 shows the direction of the fluxes in the regulating generator embodying our invention. The fields are represented by a single winding. In fact, for some types of control only one field control winding may be used.

The novel results of our invention will now be clearer when the flux changes in the magnetic circuits of the regulating generator RG, as indicated in Fig. 4, are considered in detail. For all permissible variations in load current of motor HM, the flux paths are as follows:

For poles 6 and 7, the flux is from the frame 4 through the root portion of the pole, the projection 16, enlargement 26, magnetic shunt 14, enlargement 27, projection 17, and the root portion of pole 7 back to the frame. For the other pair of poles 8 and 9, the flux is from frame 4 through the root portion of pole 8, projection 18, enlargement 28, magnetic shunt 15, enlargement 29, projection 19, the root portion of pole 9 back to the frame.

From these two paths just traced, it is apparent that no flux is provided across air gap A; and, in consequence, there is no voltage generated by the regulating generator RG as long as the load variation on motor HM is within the desired range.

As soon as the load exceeds the desired or safe value, the magnetic shunts 14 and 15 saturate and almost instantly, the regulating generator voltage begins to build up from point P along curve v to some higher value.

Since the output voltage of the regulating generator is supplied to field 33 of the control generator CG, it is apparent that the voltage of this control generator drops off sharply with the result that the voltage supplied to motor HM from the main generator MG is sharply reduced. The novel and special construction of our regulating generator thus provides a control voltage characteristic that stays at zero from the origin O to point P and then rises from point P along the solid curve v.

By prior attempts, the ideal or theoretical curve v could not be attained. At best, a characteristic somewhat like curve v' could be obtained. By proper selection of the air gaps at A, B, and C, and the dimensioning of the magnetic shunts 14 and 15 in proper relation to the main poles, not only can we obtain a curve such as v—which is for the usual constant current regulating requirements the ideal—but we may obtain any curve from v' to v''.

Further, by the use and disposition of the shunts 14 and 15 as indicated, ample space is provided for the commutating poles 12 and 13. The use of commutating poles allows for the armature load to be increased to the full current rating. The rotating regulator or regulating generator RG is thus able to commutate the same loads as an ordinary direct-current generator using the same armature.

What makes the regulating generator so effective and sensitive is the fact that the resistance of the self energizing field 32 coincides with the straight part or air-gap portion of the saturation curve. In our particular showing, it will be apparent that curve v is parallel to the air-gap line and thus is as effective as if curve v, at the sloping portion, were superimposed on the air-gap line.

While we have shown and described but one special construction of the amplifying regulating generator and have illustrated but one application, it is apparent that others, particularly after having had the benefit of our teaching, may devise regulating generators for accomplishing the same or similar results. We, therefore, do not wish to be limited to the particular showing made, but wish to be limited only to the scope of the claims hereto appended.

We claim as our invention:

1. In a direct-current generator, in combination, a magnetic frame, a plurality of pairs of poles on the frame, a magnetic shunt having a lesser transverse sectional area than the poles disposed to shunt the magnetic flux of alternate pairs of poles of opposite polarity, an armature and windings on said armature field windings on the poles for producing a flux through said armature in one sense, coils connected in series with the field windings disposed on the shunts wound to produce a flux through said armature in an opposite sense, means for exciting said field windings and coils with a current that varies from zero to some selected relatively high value, whereby the voltage output of the generator armature is substantially zero for all values of currents in said field windings and coils of a value too small to saturate the magnetic shunts.

2. In a direct-current generator, in combination, a frame, a pair of pole pieces mounted in circumferentially spaced relation on the frame, an armature, a magnetic shunt magnetically connected to the toe of one pole and the heel of the other, said magnetic shunt having a much lesser transverse sectional area than the poles, means for exciting the poles with opposite polarity by a variable magnetizing force, and means for exciting the shunt by a variable magnetizing force and in a sense to produce a flux in said armature opposite to the magnetization produced in the armature by the means for exciting the poles whereby said armature becomes magnetized in the sense determined by the means for exciting the poles only after saturation of said magnetic shunt.

3. In a direct-current generator, in combination, a frame, a pair of pole pieces mounted in circumferentially spaced relation on the frame, a projection at the heel of one pole piece and a similar projection at the toe of the other pole piece, a magnetic shunt disposed across the outward surfaces of the projections, means for exciting said shunt, an armature, said magnetic shunt being selected in dimensions and excitation characteristics to saturate at a much lesser magnetizing force than required for saturation of the pole pieces, and means for magnetizing said pole pieces with opposite polarity, and in an opposite sense with respect to the armature than the excitation of said shunts with respect to the armature, by a magnetizing force that may vary from zero to a force sufficient to saturate the pole pieces.

4. In a direct-current generator, in combination, a frame, an armature, four pole pieces secured to the frame at substantially equally spaced points on the frame, a projection at the heel of each of two diametrically opposite poles, a similar projection at the toe of each of the other two diametrically opposite poles, a magnetic bridge disposed over each of the two facing projections, and means for magnetizing the pole pieces and the magnetic bridges by a magnetizing force that may vary from zero to a given maximum, said magnetic bridges being dimensioned to become saturated at a magnetizing force considerably less than said given maximum, the direction of the magnetization in each of said bridges being such that the magnetomotive force produced thereby in the armature is in an opposite sense to the magnetomotive force produced in the armature by the magnetization of the pole pieces.

5. In a direct-current generator, in combination, a frame, an armature, four pole pieces secured to the frame at substantially equally spaced points on the frame, a projection at the heel of each of two diametrically opposite poles, a similar projection at the toe of each of the other two diametrically opposite poles, a magnetic bridge disposed over each of the two facing projections, commutating poles disposed between the pole pieces at each of the facing regions of the pole pieces having no projections, and means for magnetizing the pole pieces and the magnetic bridges by a magnetizing force that may vary from zero to a given maximum, said magnetic bridges being dimensioned to become saturated at a magnetizing force considerably less than said given maximum, and the direction of the magnetization in said bridges being such that the magnetomotive force produced in the armature is in an opposite sense to the magnetomotive force produced in the armature by the magnetization of the pole pieces.

6. In a direct-current regulating generator, in combination, a frame, an armature, and an even number of pole pieces secured to the frame, a projection on the toe of every odd-numbered pole piece, a projection on the heel of every even-numbered pole piece, a magnetic shunt magnetically connecting each pair of facing projections, said magnetic shunts being dimensioned to saturate sooner than the pole pieces, means for exciting the magnetic shunts from zero to a value sufficient to saturate the shunts and in a direction to produce a magnetomotive force in the armature in one direction, and exciting means for the pole pieces for producing a magnetizing force that may vary from zero to a value sufficient to saturate the pole pieces proportional to the magnetizing force in the magnetic shunt and in a direction to produce a magnetomotive force in the armature in another direction, whereby the magnetization of the armature remains at below zero for one range of rise in magnetizing force and rises proportional to the magnetizing force for still larger rises of magnetizing force.

7. In a direct-current regulating generator, in combination, a frame, an armature, and an even number of pole pieces mounted at equally spaced points on the inner surface of the frame, a relatively thick projection at the heel of every odd-numbered pole piece, a similar projection at the toe of every even-numbered pole piece, each pair of facing projections having coplanar flat surfaces at the regions remote from the armature, magnetic shunts, of considerably lesser cross-section than the pole pieces, disposed across the flat surfaces of each pair of facing projections, and means for proportionally magnetizing the pole pieces and shunts by a magnetizing force that may be varied from zero to such value as to saturate the pole pieces, the direction of the magnetization of the shunts being so chosen that the magnetizing effect in the armature is opposite to the magnetizing effect in the armature produced by the magnetization of the pole pieces.

8. In a direct-current regulating generator, in combination, a frame, an armature, and an even number of pole pieces mounted at equally spaced points on the inner surface of the frame, a relatively thick projection at the heel of every odd-numbered pole piece, a similar projection at the toe of every even-numbered pole piece, each pair of facing projections having coplanar flat surfaces at the regions remote from the armature, magnetic shunts, of considerably lesser cross-section than the pole pieces, disposed across the flat surfaces of each pair of facing projections, commutating poles disposed in each of the spaces between the pole pieces not occupied by projections, and means for proportionally magnetizing the pole pieces and shunts by a magnetizing force that may be varied from zero to a value to saturate the pole pieces, the direction of the magnetization of the shunts being so chosen as to produce a magnetomotive force in said armature opposite to the magnetomotive force produced in the armature by the magnetization of the pole pieces.

9. In combination, a first magnetic circuit having an air gap therein, a parallel magnetic member shunting said air gap and of lesser cross-sectional area than said first magnetic circuit, excitation means for said first magnetic circuit, excitation means for said parallel magnetic member shunting said air gap, means for simultaneously energizing both of said excitation means, the winding relation of said two excitation means being such as to produce opposing magnetomotive forces across said air gap, and magnetic flux responsive means disposed in said air gap to be linked by the magnetic flux thereacross.

10. In an electric potential producing device, in combination, a magnetic circuit including; a main part, a secondary part including means having circuits for producing an electrical potential, and a magnetic shunt across said secondary part, said shunt having a section such that it becomes saturated more readily than said main part and secondary part, means for exciting the main part in such manner to produce a magnetomotive force from left to right in the secondary part and left to right in said shunt, and means for exciting the shunt in such manner to produce a magnetomotive force from right to left in the secondary part but from left to right in said shunt, whereby the electrical potential produced may be caused to vary, with a proportional variation of the excitation of the main part and shunt from zero to a value sufficient to saturate the main part, from zero to a given relatively low potential value for a variation of the excitation from zero to a given value, and from said given relatively low potential value to a relatively high positive potential value for a variation of the excitation from said given value to a value sufficient to saturate the main part.

11. In an electric potential producing device, in combination, a magnetic circuit including, a main part having a relatively large sectional area, a secondary part including rotatable armature means having circuits for producing an electrical potential and having a sectional area substantially equal to the sectional area of the main part, and a magnetic shunt across said secondary part, said shunt having a section such that it becomes saturated more readily than said main part and secondary part, means for exciting the main part in such manner to produce a magnetomotive force from left to right in the secondary part and left to right in said shunt, and means for exciting the shunt in such manner to produce a magnetomotive force from right to left in the secondary part but from left to right in said shunt, whereby the electrical potential produced may be caused to vary, with a proportional variation of the excitation of the main part and shunt from zero to a value sufficient to saturate the main part, from zero to a given relatively low potential value for a variation of the excitation from zero to a given value, and from said given relatively low potential value to a relatively high positive potential value for a variation of the excitation from said given value to a value sufficient to saturate the main part.

12. A dynamo-electric machine for regulation, in combination, a direct-current generator having an armature, or rotor, and windings thereon, a magnetic circuit for providing a flux through the armature in one sense, said circuit including a frame member, two poles and the armature, the frame member being separated from the outer ends of the poles by relatively large air gaps, a second magnetic circuit for providing a flux through the armature in another sense, said second magnetic circuit including a second frame, the same two poles, and the armature, said second frame being of much lesser sectional area than the first magnetic circuit, first field windings for producing a flux in the first magnetic circuit, means for varying the excitation current of the first field windings from zero to saturation of the first magnetic circuit, second field windings for producing a flux in the second magnetic circuit, means for varying the excitation current of the second field windings from zero to saturation of the restricted sectional portion of the second magnetic circuit, the winding direction and current direction in the second field windings being such that the magnetomotive force across the armature is in opposition to the magnetomotive force produced across the armature by the current in the first field windings.

13. A dynamo-electric machine for regulation, in combination, a direct-current generator having an armature, or rotor, and windings thereon, a magnetic circuit for providing a flux through the armature in one sense, said circuit including a frame member, two poles and the armature, the frame member being separated from the outer ends of the poles by relatively large air gaps, a second magnetic circuit for providing a flux through the armature in another sense, said second magnetic circuit including a second frame, the same two poles, and the armature, said second frame being of much lesser sectional area than the first magnetic circuit, first field windings for producing a flux in the first magnetic circuit, second field windings for producing a flux in the second magnetic circuit, means for varying the excitation current in the second field windings from zero to saturation of the restricted sectional portion of the second magnetic circuit, the winding direction and current direction in the second field windings being such that the magnetomotive force across the armature is in opposition to the magnetomotive force produced across the armature by the current in the first field windings.

14. A dynamo-electric machine for regulation, in combination, a direct-current generator having an armature, or rotor, and windings thereon, a magnetic circuit for providing a flux through the armature in one sense, said circuit including a frame member, two poles and the armature, the frame member being separated from the outer ends of the poles by relatively large air gaps, a second magnetic circuit for providing a flux through the armature in another sense, said second magnetic circuit including a second frame, the same two poles, and the armature, said second frame being of much lesser sectional area than the first magnetic circuit, first field windings for producing a flux in the first magnetic circuit, second field windings for producing a flux in the second magnetic circuit, the winding direction and current direction in the second field windings being such that the magnetomotive force across the armature is in opposition to the magnetomotive force produced across the armature by the current in the first field winding.

15. A dynamo-electric machine for regulation, in combination, a direct-current generator having an armature, or rotor, and windings thereon for producing a voltage output, and having three magnetic circuits, the first circuit including a frame member, two poles and the armature, the frame member being separated at the ends remote from the armature by relatively large air gaps, the second magnetic circuit including a second frame member, the same two poles, and the armature, the second frame member having low reluctance connections with the poles at points remote from the armature and having a sectional area considerably less than the first magnetic circuit, whereby the second frame member will normally saturate considerably sooner than the first magnetic circuit, and the third magnetic circuit including the two frame members, winding means on the first frame member, and winding means on the second frame member, the winding relation and the direction of the current normally in use being such that the magnetomotive forces produced by the currents in the windings is additive in the third magnetic circuit.

16. A dynamo-electric machine for regulation, in combination, a direct-current generator having an armature, or rotor, and windings thereon for producing a voltage output, and having three magnetic circuits, the first circuit including a frame member, two poles and the armature, the frame member being separated at the ends remote from the armature by relatively large air gaps, the second magnetic circuit including a second frame member, the same two poles, and the armature, the second frame member having low reluctance connections with the poles at points remote from the armature and having a sectional area considerably less than the first magnetic circuit, whereby the second frame member will normally saturate considerably sooner than the first magnetic circuit, and the third magnetic circuit including the two frame members, winding means on the first frame member, winding means, connected in series with the first winding means, disposed on the second frame member, the winding direction being so chosen that when current traverses the winding means the magnetomotive forces produced in the third magnetic circuit will be additive.

ALBERT W. KIMBALL.
MARTIN H. FISHER.

REFERENCES CITED

The following references are of record in the file of this patent:

UNITED STATES PATENTS

| Number | Name | Date |
| --- | --- | --- |
| 2,058,339 | Metzger | Oct. 20, 1936 |
| 2,264,272 | Blankenbuehler et al. | Dec. 2, 1941 |
| 2,378,894 | Blankenbuehler | June 26, 1945 |
| 2,383,971 | Ivy | Sept. 4, 1945 |